J. D. SMITH.
Seed Planter.
No. 18,524.
Patented Oct. 27, 1857.
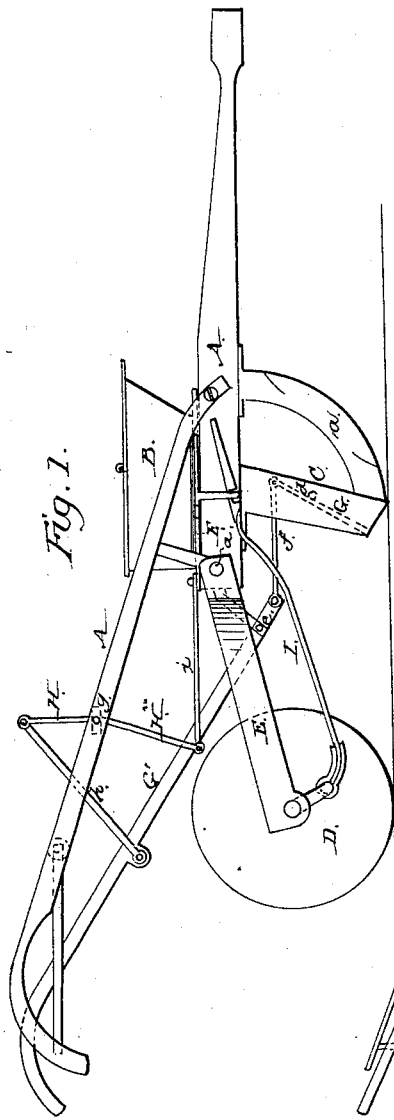
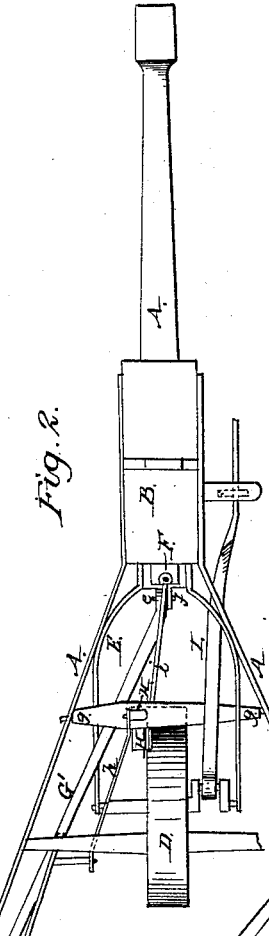
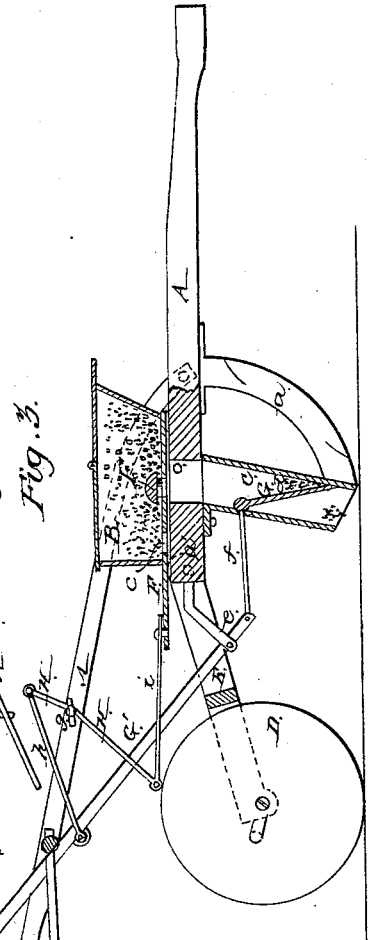

UNITED STATES PATENT OFFICE.

J. D. SMITH, OF LANCASTER, OHIO.

IMPROVEMENT IN SEED-PLANTERS.

Specification forming part of Letters Patent No. 18,524, dated October 27, 1857.

*To all whom it may concern:*

Be it known that I, JOSEPH D. SMITH, of Lancaster, in the county of Fairfield and State of Ohio, have invented a new and useful Improvement in Corn-Planting Plows; and I do hereby declare that the following is a full, clear, and exact description of the same, reference being had to the annexed drawings, forming part of this specification, in which—

Figure 1 is a plan, Fig. 2 a side view, and Fig. 3 a vertical central section, of a corn-planting plow constructed after my invention.

Similar letters of reference indicate corresponding parts in the several figures.

The nature of my invention consists, for use, in connection with a planter to be propelled by hand, in the arrangement consisting of the double-acting valves, compound lever, double-chambered hopper, adjustable pitman, and swinging self-adjusting roller, the whole being arranged and combined substantially as set forth, and serving to enable the operator to plant in hills by hand at each half-vibration of the valve, and when necessary to plant in drills by the revolution of the roller.

To enable others skilled in the art to make and use my invention, I will proceed to describe it.

A represents an ordinary plow-frame, which has arranged on top of its beam a seed-hopper, B.

C is a drill-tube. It has a taper curved bar, $a$, in front of it, which extends up from the lower end of the tube to the beam and serves for opening the furrow and preventing the end of the tube from being stopped up or choked by weeds, &c., it cutting up such obstruction as it moves forward.

D is a roller behind the drill-tube. It is hung in a frame, E, which is attached by a fulcrum-pin to the rear end of the plow-beam. This roller serves for the steadying of the plow and for covering the seed and closing up the furrow. The frame E is hung on a fulcrum, $a'$, in order that the roller may rise and fall in passing over undulating soil.

F is the seed-slide. It has two seed-holes, $b$ $c$, one at its front end and the other at its rear end, as shown. The hole $b$ drops seed as the slide moves back and the hole $c$ as the slide moves forward.

F' is a flexible cut-off at the center of the hopper.

G is the valve in the lower end of the tube. It swings on a fulcrum, $d$. This valve is designed, during check-row planting, for retaining the corn in the end of the tube until the proper time to allow it to escape into the soil. It also prevents the corn, owing to its being near the end of the tube, from being scattered in escaping.

G' is a handle or lever arranged alongside the handle of the plow, so as to be laid hold of by the hand when the plow-handle is taken hold of. It has its fulcrum at $e$, and is connected with the valve by a connecting-link, $f$, as shown.

H is another lever. It has its fulcrum at $g$, and is connected with the handle G' by a rod, $h$, and to the slide by a similar rod, $i$, as represented.

I is a pitman-rod for operating the slide while planting in drills.

*Operation of planting in hills or check-rows.*— The levers G' and H being attached, as described, to the slide and valve, the machine is moved forward until it arrives at a hill. At this moment the lever G is depressed by the hand and the valve caused to form a receptacle for the corn at the front end of the tube and leave a space for the escape of the corn at the rear by standing diagonally across the tube. Simultaneously with this operation of the valve the seed-slide moves backward and drops corn into the receptacle. The lever is now raised and the valve made to form a receptacle at the rear of the tube and leave a space for the escape of the corn at the front by standing diagonally across the tube, but in an opposite manner to what it just did. As the corn first dropped by the slide escapes, another hill is deposited into the receptacle, ready for the next hill to be planted, and thus the operation proceeds until the field is planted.

To plant in drills, the mechanism combining the slide and valve is detached from the slide and valve and the pitman connected to the slide. During the operation of planting in drills the valve stands vertically in the tube and the corn escapes into the soil on either side of it.

What I claim as my invention, and desire to secure by Letters Patent, is—

The use, in connection with a planter to be propelled by hand, of the arrangement consisting of the double-acting valves F G, compound lever G H $g$ $h$ $i$, double-chambered hopper B F', adjustable pitman I, and swinging self-adjusting roller D, the whole being arranged and combined substantially as set forth.

JOSEPH D. SMITH.

Witnesses:
P. B. EWING,
JNO. D. MARTIN.